Sept. 3, 1963 W. PLANK 3,102,343
MEASURING APPARATUS FOR MACHINE TOOLS
Filed Dec. 21, 1959 2 Sheets-Sheet 1

INVENTOR
WALTER PLANK

BY Dicke, Craig & Freudenberg
ATTORNEYS

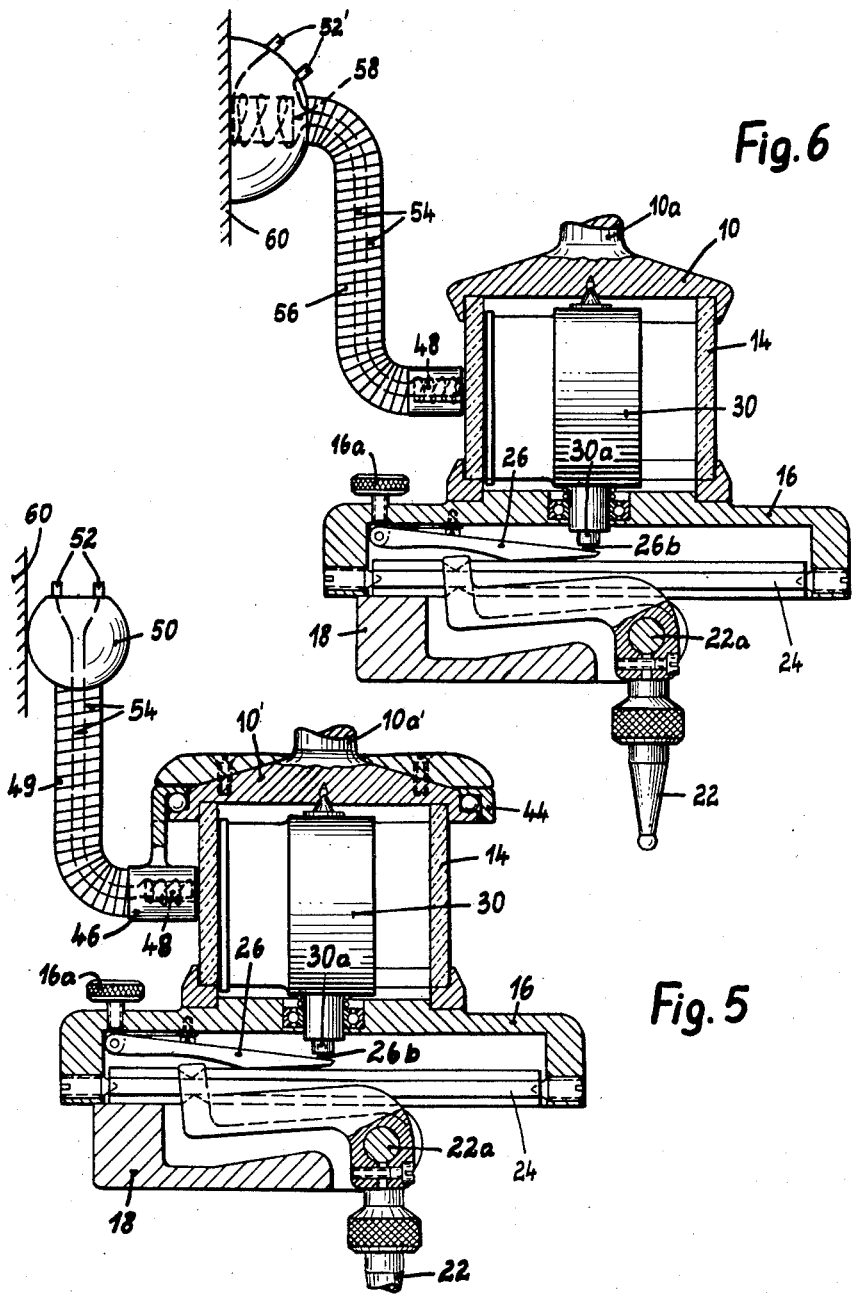

United States Patent Office 3,102,343
Patented Sept. 3, 1963

3,102,343
MEASURING APPARATUS FOR MACHINE TOOLS
Walter Plank, Munich, Germany, assignor to Friedrich
Wilhelm Deckel, Munich Germany
Filed Dec. 21, 1959, Ser. No. 861,026
Claims priority, application Germany Dec. 23, 1958
16 Claims. (Cl. 33—172)

This invention relates to an improved measuring appliance to be utilized with machine tools or the like, and particularly to a measuring appliance having a structural portion which is rotatably movable during a measuring operation but in which it is desired that an indicating instrument such as a dial gauge or the like on said structural portion have a fixed orientation so that it may be continuously observed, notwithstanding continued movement of this structural portion.

One of the objects of this invention is to provide an improved measuring apparatus of the type referred to hereinabove in which the indicating instrument may be substantially totally enclosed to protect it from dirt and damaging abuse.

Still another object of this invention is to provide an improved simplified apparatus including a holder for an indicating instrument and simplified arrangement for maintaining the indicating instrument in a predetermined viewing position while the holder carrying the instrument is moved relative thereto.

A further object of this invention is to provide an improved enclosure for an indicating instrument, which enclosure has a transparent portion permitting continuous observation of the instrument, notwithstanding relative movement of the enclosure with respect to the instrument.

A still further object of the present invention is to maintain or anchor in a fixed position an adjustably positioned indicating instrument in apparatus of the aforementioned type while, at the same time, permitting structural parts of the apparatus to rotate about said instrument on all sides thereof.

Another object of the present invention is to achieve, in apparatus of the aforementioned type, a holding of the indicating instrument in a fixed position without physical contact with the instrument by the anchoring means therefor.

Another object of this invention is to utilize magnetic attraction of cooperating members to hold an indicating instrument of the aforementioned type in its anchored position in a simplified structure.

Another object of the present invention is to achieve high precision in holding an indicating instrument in a desired position in apparatus of the above type.

Still another object of this invention is to achieve improved means for anchoring the position of the indicating instrument in apparatus of the above type utilizing electromagnets.

In a preferred form, this invention relates to the improvement of a known scanning lever measuring appliance with a holder adapted to be inserted into a rotatable spindle of a machine tool or the like. The holder rotating with the spindle is provided on the one hand with a scanning lever for scanning the surface of a work piece, while, on the other hand, there is supported on it an annular component with a dial gauge actuated by the scanning lever, in such a manner that the dial gauge is kept stationary for enabling it to be read. The dial gauge and the constructional part supporting it are accessible from the outside so that, for keeping them stationary, it is sufficient to provide the supporting constructional part with an arm which runs against a machine part acting as an abutment. The arm is bendable and non-elastic, so that it will retain the form given it. The constructional part supporting the dial gauge is thus adjustable to any angular positions around the spindle axis, so that the gauge can be held in a position suitable for taking readings.

It has been found desirable to mount the dial gauge on the inside of an enclosed part of the appliance, for instance, so as to protect it from becoming dirty or being damaged, but there is the difficulty that it cannot be held in position in the hitherto usual manner with mechanical means, just for the reason that it is inaccessible from the outside. Nevertheless, a construction of this kind is highly desirable for an even additional reason that it enables the dial gauge to be mounted coaxially with the spindle axis. The relative movement between the scanning pin of the stationary dial gauge and the revolving transmission parts actuated by the scanning lever is at its smallest, when the pin is positioned in the spindle axis, while it increases as the radial distance from the spindle axis increases. Wear of the parts is a minimum when this relative movement is minimum.

This invention provides that the dial gauge is protected and inaccessible from the outside by being substantially enclosed and that the dial gauge and a stationary adjustable holding part are constructed to mutually cooperate by magnetic attraction to hold themselves in fixed positions with respect to each other. The mechanical holding parts of the prior art, the usual mounting of which is not possible according to the present invention, are replaced according to the invention by magnetic lines of force, which are effective across an air gap and allow room for connecting parts rotating in the air gap without the lines of force being disturbed by them; i.e., these connecting parts are preferably magnetically neutral.

In a preferred constructional form of the invention, the part to be inserted into the spindle is connected with the part of the holder supporting the scanning lever by means of a transparent hollow cylinder of a magnetically neutral material which is coaxial with the axis of spindle rotation. In addition, the dial gauge is supported within the hollow cylinder so as to be rotatable about the longitudinal axis of its axially movable scanning pin, which is coaxial with the axis of spindle rotation, and the supporting part is disposed outside of the hollow cylinder.

Further advantages, objects, and features falling within the scope of this invention will be gathered from the following description of constructional examples of the invention, and the present examples are not to be taken as limiting the scope of this invention other than as defined in the appended claims, the preferred examples being illustrated in the drawings, wherein:

Figure 3:
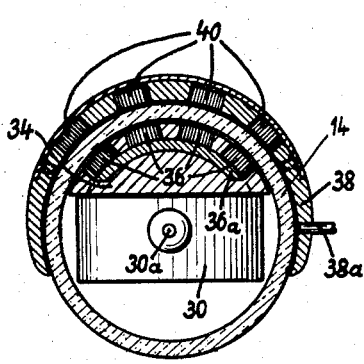
FIGURE 3 is a cross section on line A—A of FIGURE 1, but with the dial gauge shown in full.
Figure 1:
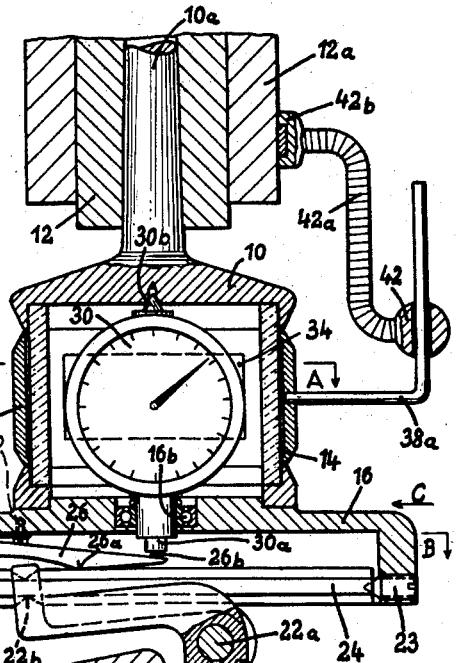
FIGURE 1 shows a longitudinal section through the appliance with a dial gauge and actuating levers therefor shown in full for the sake of clarity.
Figure 2:
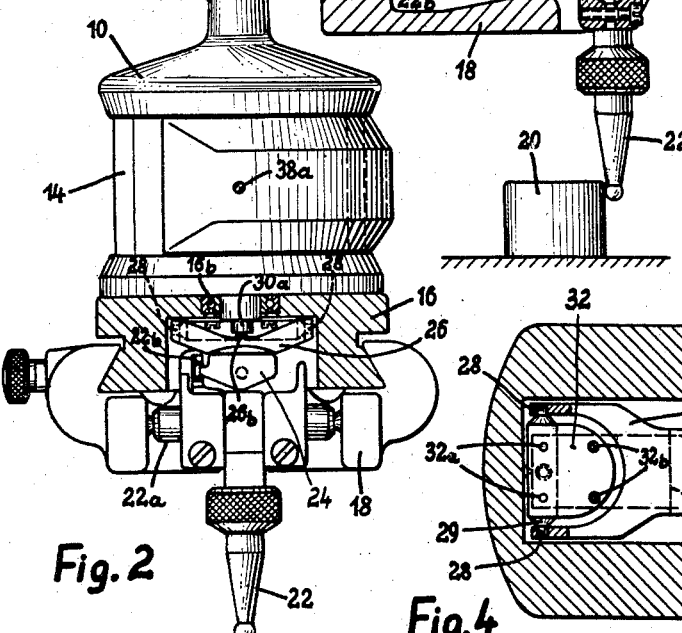
FIGURE 2 is a view perpendicular to the longitudinal section of FIGURE 1, viewed in the direction of arrow C, and partially cut away to show more clearly lever actuation for the dial gauge.
Figure 4:
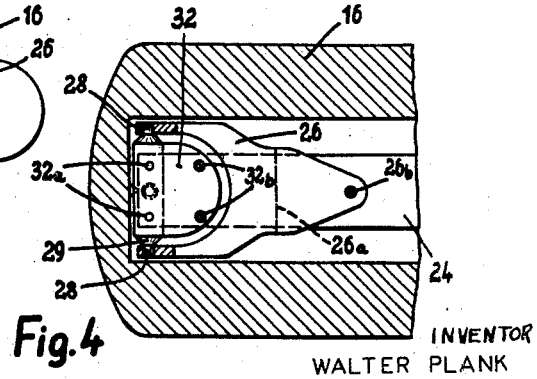
FIGURE 4 is a partial cross section on line B—B of FIGURE 1.

FIGURES 5 and 6 are views generally similar to FIGURE 1 but show other constructional forms of the appliance embodying the present invention, the dial gauge in each of FIGURES 5 and 6 being rotated 90° with respect to the position of FIGURE 1, and facing to the right.

The scanning lever measuring appliance illustrated in FIGURES 1 to 4 show a holder 10 which is adapted to have its cone or tapered extension 10a inserted into a spindle 12 of the machine, which is not shown. In the holder 10 is fixed one end of a hollow cylinder 14 of strong, transparent magnetically neutral material, such as glass or synthetic material, which is coaxial with the axis of rotation of spindle 12 and cone 10a. To the other end of the hollow cylinder 14 is fixed a supporting plate 16, having parallel guides at opposite sides (FIGURE 2), on which is mounted for sliding movement perpendicularly to the axis of spindle rotation a slide 18 capable of being fixed in position by means of any suitable clamp. In the slide 18 there is pivotally supported at 22a a scanning lever 22, which scans the test piece 20 by physical engagement therewith. The movements of the scanning lever are transmitted by its jaw 22b to a pivoted plate 24 pivoted in its longitudinal axis at the adjustable screw points 23 on supporting plate 16. A forked-shaped transmission lever 26 is supported so as to be capable of rocking about bearing pins 28 and rests toward the other end with its knife edge 26a on the upper surface of the pivoted plate 24, so that, on occurrence of pivoting motions of the scanning lever 22, the plate 24 is pivoted thereby, and, due to the rocking of knife edge 26a on plate 24, as the latter pivots, the transmission lever 26 will be pivoted about the bearing pins 28. This pivoting motion of the transmission lever 26 is transmitted by way of its supporting dome 26b to the axially movable scanning pin 30a of the dial gauge 30, which lies in the spindle axis and is axially movable. From the foregoing it is apparent that the scanning lever 22 and the scanning pin 30a are interconnected by means of a multiple-lever structure including the plate 24 and lever 26.

The bearing pins 28 on which lever 26 is pivoted are formed by the ends of a shaft 29 which is fixed by means of two rivets 32a on a small spring plate 32. The small plate itself is fixed by screws 32b on the supporting plate 16. By adjusting a regulating screw 16a mounted in the hold plate and bearing against the small plate 32, the latter can be deflected downwards, which, at the transmission lever 26, will cause a pivoting motion about its knife edge 26a. The supporting dome 26b will at the same time also be displaced and the pointer of the dial gauge can by this means be brought to an initial position favorable for taking a reading or to a zero position.

The dial gauge 30 is arranged inside the hollow cylinder 14 in such a manner that the longitudinal axis of the scanning pin 30a coincides with the spindle axis and the plane of its dial face thus lies parallel to this axis. The dial gauge is supported by means of a ball bearing 16b in the supporting plate 16 and by means of a bearing point 30b in the holder 10, so as to be freely rotatable. In order to be able to hold the dial gauge in a position suitable for taking readings during the rotary motions of the parts 10 to 18 and 22, an arrangement is provided, of which FIGURES 1 to 4, 5, and 6 show various embodiments.

To the rear side of the dial gauge (FIGURE 3), a synthetic non-magnetic material support 34 is fixed, in which some plate-shaped permanent magnets 36 with alternating directions of polarity are embedded in succession in the direction of rotation of cylinder 14, and are interconnected by a soft iron insertion 36a. The magnets 36 are at a small distance from the inner surface of the hollow cylinder 14. The position of magnets 36 and the dial gauge 30 is anchored by means of a carrier 38 of arcuate cross section placed so as to slide thereon, and is secured by the end edges of parts 10 and 16 against axial displacement. The carrier 38 is of springy material, for instance, synthetic material, so that even if it extends over more than 180° for securing it safely, it can be pushed onto and removed from the hollow cylinder. In the carrier 38 there are also inserted, opposite magnets 36, several plate-shaped permanent magnets 40 with alternating polarity. The magnets 40 attract the magnets 36 and turn the dial gauge in such a manner that the permanent magnets will be positioned as closely as possible to one another. This ensures the dial gauge 30 being held in that position which results from the angular position of the magnet carrier 38 with respect to the axis of rotation. The magnet carrier 38 can readily be placed in any angular position and be held there by an abutment, for instance, by means of a small holding bar 38a bent away parallel to the spindle axis (FIGURE 1), which engages in a bore of a stationary holder 42. It is fixed by means of a flexible corrugated tube 42a provided with suitable securing or clamping means such as a magnet 42b to any suitable part of the machine; for, example, as shown in the drawing, to a flat piece of the stationary magnetic headstock 12a. The illustrated arrangement for holding the magnet carrier in position allows a greater displacement of the scanning lever measuring appliance in the direction of the axis of rotation, without the angular position of the dial gauge being thereby altered.

The described mode of support of the dial gauge and the punctiform contact between the lever 26 and the scanning pin 30a makes possible an easy-motion rotational movement of the dial gauge in relation to the rotating parts of the scanning lever measuring appliance, so that the dial gauge is held by the magnet arrangement firmly in the scale reading position.

Through the soft iron insertion 36a the dial gauge and its parts are substantially screened from the magnetic action. For safety reasons, the use of magnetic materials for the dial gauge should preferably be avoided, so as to render its readings as far as possible independent of any stray magnetic lines of force.

In the constructional example according to FIGURE 5, which substantially corresponds with the appliance according to FIGURE 1, with like reference numerals designating like parts and prime notation being used to designate substantially similar parts, a ring 44 is supported rotatably by means of a ball bearing on the convex surface of the holder 10'. The ring supports in a casing 46 an electromagnet 48, which, with one pole, faces the hollow cylinder 14. Between the magnet core and the hollow cylinder is an air gap. To the casing 46 is fixed a flexible corrugated tube 49 which, at its other end, supports a ball 50. This ball is suitable for the reception at its electrical terminal plugs 52 of a source of current for energizing the electromagnet 48. The connecting cables 54 therefor are laid in the interior of the corrugated tube. FIGURES 5 and 6 may use a simpler armature opposite magnet 48.

According to FIGURE 6, the electromagnet 48 is fixed at the end of a corrugated tube 56 which, by means of an anchoring magnet 58 at its other end, adheres to a diagrammatically indicated magnetic machine part 60. The anchoring magnet may be a permanent magnet as in FIGURE 1, but is illustrated as an electromagnet. The plug 52' to a source of current (not shown), as well as the cables 54, are arranged in the same way as in the example according to FIGURE 5, but energize both magnets 48 and 58. The corrugated tube is non-elastic and flexible; the magnet 49 will in this case as well preferably be so placed that between it and the hollow cylinder there is a clear air gap.

While I have shown and described one embodiment in accordance with the present invention, it is understood that the same is not limited thereto but is susceptible of many changes and modifications within the spirit and scope of the present invention, and I therefore do no wish to be limited to the details shown and described herein but intend to cover all such changes and modifications as are encompassed by the scope of the appended claims.

I claim:

1. Scanning lever measuring apparatus for use on a machine tool or the like comprising an indicating instrument, a holder for said instrument including means for mounting the instrument thereon providing for relative movement of the instrument with respect to the holder, scanning lever means on said holder connected to actuate said instrument, means for supporting said holder on a movable part of said machine tool with said lever means positioned to scan a workpiece during said movement, means secured to a relatively stationary part of said machine tool and including magnetic means magnetically coupled to other magnetic means secured to said instrument for holding the latter in a predetermined position relative to said relatively stationary part during movement of said holder and said movable part, said holder substantially completely enclosing said instrument and having a transparent portion providing for continuous observation of said instrument during said movement of said holder and said movable part.

2. A scanning lever measuring appliance comprising a holder adapted to be inserted into a rotatable spindle of a machine tool or the like for rotation with said spindle, said holder including scanning lever means rotatable therewith, dial gauge means including a dial gauge operatively connected for actuation by said scanning lever means and movably mounted on said holder, and anchoring means secured to a relatively fixed part and including first magnetic means magnetically coupled to second magnetic means forming part of said dial gauge means for holding said dial gauge stationary in a predetermined viewing position during rotational movement of said holder.

3. A scanning lever measuring appliance according to claim 2, wherein said first magnetic means includes a permanent magnet means on said anchoring means.

4. A scanning lever measuring appliance according to claim 2, wherein said first and second magnetic means includes magnetic structures on said anchoring means and secured to said dial gauge, respectively, at least one of said structures consisting of a plurality of permanent magnets arranged in succession in the direction of rotation of said holder with alternating poles of opposite polarity facing the other cooperating magnetic structure.

5. A scanning lever measuring appliance according to claim 4, wherein said other cooperating structure also comprises a similar succession of poles of alternately opposite polarity.

6. A scanning lever measuring appliance according to claim 2, wherein said holder comprises a transparent hollow cylinder of magnetically neutral material between the part of said holder to be inserted into the spindle and said scanning lever means, said cylinder being coaxial with said axis of rotation of the holder, the dial gauge being positioned within said cylinder for viewing therethrough.

7. A scanning lever measuring appliance according to claim 6, wherein said dial gauge includes an axially movable scanning pin, said gauge being supported within said holder with the axis of said pin coaxial with the axis of said holder.

8. A scanning lever measuring appliance according to claim 7, wherein said holder substantially encloses said dial gauge and wherein said pin projects externally of said holder and is arranged to be actuated axially by said scanning lever means.

9. A scanning lever measuring appliance according to claim 6, wherein said anchoring means is arranged outside the hollow cylinder.

10. A scanning lever measuring appliance according to claim 9, wherein said anchoring means encircles more than 180° of the periphery of said hollow cylinder.

11. A scanning lever measuring appliance according to claim 9, wherein said anchoring means comprises a bearing seat at least partially embracing the hollow cylinder and is slidable thereon.

12. A scanning lever apparatus according to claim 9, wherein said anchoring means comprises a ring which is coaxial with the holder axis, bearing means supporting said ring on an external convex surface of the holder, said anchoring means including a magetic structure facing a convex surface of said hollow cylinder opposite said dial gauge and held in spaced relationship with respect thereto by said bearing means.

13. A scanning lever measuring appliance according to claim 2, wherein said anchoring means comprises a flexible, non-elastic structure for connection to said relatively stationary part of the machine.

14. A scanning lever measuring appliance according to claim 13, wherein said flexible structure includes further magnetic means for anchoring one end thereof to said relatively fixed part.

15. A scanning lever measuring appliance according to claim 13, wherein at least one of said further magnetic means includes an electromagnet.

16. A scanning lever measuring appliance according to claim 13, wherein said flexible, non-elastic structure is tubular and carries an electromagnet positioned opposite the dial gauge outside of said cylinder and comprises electrical connections extending through said flexible structure.

References Cited in the file of this patent

UNITED STATES PATENTS

| | | |
|---|---|---|
| 2,076,819 | Jones | Apr. 13, 1937 |
| 2,423,269 | Summers | July 1, 1947 |
| 2,483,743 | Turrettini | Oct. 4, 1949 |
| 2,645,024 | Pool | July 14, 1953 |
| 2,747,293 | Lyons | May 29, 1956 |